(12) United States Patent
Kirisken et al.

(10) Patent No.: US 10,845,883 B2
(45) Date of Patent: Nov. 24, 2020

(54) METHOD FOR GENERATING A HAPTIC EFFECT AND DEVICE EMPLOYING THE METHOD

(71) Applicants: VESTEL ELEKTRONIK SANAYI VE TICARET A.S., Manisa (TR); OZYEGIN UNIVERSITESI, Istanbul (TR)

(72) Inventors: Barbaros Kirisken, Manisa (TR); Ozkan Bebek, Manisa (TR)

(73) Assignees: VESTEL ELEKTRONIK SANAYI VE TICARET A.S., Manisa (TR); OZYEGIN UNIVERSITESI, Istanbul (TR)

( * ) Notice: Subject to any disclaimer, the term of this patent is extended or adjusted under 35 U.S.C. 154(b) by 0 days.

(21) Appl. No.: 16/474,964

(22) PCT Filed: Sep. 21, 2017

(86) PCT No.: PCT/EP2017/073923
§ 371 (c)(1),
(2) Date: Jun. 28, 2019

(87) PCT Pub. No.: WO2018/121894
PCT Pub. Date: Jul. 5, 2018

(65) Prior Publication Data
US 2019/0346926 A1 Nov. 14, 2019

(30) Foreign Application Priority Data
Dec. 29, 2016 (EP) .................................... 16207426

(51) Int. Cl.
*G06F 3/01* (2006.01)
*G06F 1/16* (2006.01)
*G06F 3/041* (2006.01)

(52) U.S. Cl.
CPC ............ *G06F 3/016* (2013.01); *G06F 1/1684* (2013.01); *G06F 3/041* (2013.01)

(58) Field of Classification Search
CPC ......... G06F 3/016; G06F 3/041; G06F 1/1684
See application file for complete search history.

(56) References Cited

U.S. PATENT DOCUMENTS 8,860,562 B2   10/2014   Hill
9,235,267 B2   1/2016    Burrough et al.
(Continued)

FOREIGN PATENT DOCUMENTS

EP        2 733 576 A1    5/2014

OTHER PUBLICATIONS

Bill Black et al., "Basics of Voice Coil Actuators" PCIM—Jul. 1993, pp. 44-46.
(Continued)

*Primary Examiner* — Ariel A Balaoing
(74) *Attorney, Agent, or Firm* — Brooks Kushman P.C.

(57) ABSTRACT

The novel linear resonance actuator driving pattern embodied by the AC driving signal waveform may have an all positive (or all negative) actuation, starting oscillations with a first frequency just under the resonance frequency of the linear resonance actuator driving in a first time segment of the drive period. In the first time segment, the amplitude of the AC driving signal also reaches a local maximum. The frequency is then increased to the resonance frequency in a second time segment longer than the first time segment. In the second time segment, the amplitude reaches an overall peak amplitude. Then, the driving frequency along with the amplitude is gradually reduced in a third time segment longer than the second time segment.

15 Claims, 12 Drawing Sheets

(56) References Cited

U.S. PATENT DOCUMENTS

| | | | |
|---|---|---|---|
| 2005/0052415 A1 | 3/2005 | Braun et al. | |
| 2007/0152974 A1 | 7/2007 | Kim et al. | |
| 2008/0084384 A1* | 4/2008 | Gregorio | G06F 3/016 345/156 |
| 2010/0097198 A1 | 4/2010 | Suzuki | |
| 2010/0153845 A1* | 6/2010 | Gregorio | G01H 11/06 715/702 |
| 2010/0182220 A1 | 7/2010 | Bathiche et al. | |
| 2010/0328229 A1* | 12/2010 | Weber | G06F 1/1626 345/173 |
| 2011/0148608 A1 | 6/2011 | Grant et al. | |
| 2012/0025742 A1* | 2/2012 | Masahiko | H02P 25/032 318/114 |
| 2012/0200509 A1 | 8/2012 | Cheung et al. | |
| 2012/0229264 A1* | 9/2012 | Company Bosch | G06F 3/016 340/407.1 |
| 2014/0118126 A1* | 5/2014 | Garg | G06F 3/016 340/407.1 |
| 2015/0054770 A1* | 2/2015 | Taninaka | G06F 3/016 345/173 |
| 2016/0155305 A1 | 6/2016 | Barsilai et al. | |
| 2016/0246376 A1 | 8/2016 | Birnbaum et al. | |

OTHER PUBLICATIONS

PCT International Search Report and Written Opinion of the International Searching Authority, dated Nov. 15, 2017, Application No. PCT/EP2017/073923, Applicant Vestel Elektronik Sanayi Ve Ticaret A S, 13 Pages.

* cited by examiner

METHOD FOR GENERATING A HAPTIC EFFECT AND DEVICE EMPLOYING THE METHOD

CROSS-REFERENCE TO RELATED APPLICATIONS

This application is the U.S. national phase of PCT Application No. PCT/EP2017/073923 filed on Sep. 21, 2017, which claims priority to European Patent Application No. EP 16207426.4 filed on Dec. 29, 2016, the disclosures of which are incorporated in their entireties by reference herein.

TECHNICAL FIELD

The present disclosure relates to a method for generating a haptic effect and to a device configured to employ such a method.

BACKGROUND

Touch screen operation has become a common technology for a multitude of applications, such as mobile phones and other consumer electronic devices. In order to provide haptic feedback and thus improve ease of operation, various hardware elements are commonly used to generate vibrations, in particular eccentric rotating mass motors, piezoelectric actuators and linear resonant actuators.

A linear resonant actuator comprises a voice coil pressing against a moving magnetic mass connected to a spring. The voice coil is driven by an electrical driving signal in order to produce an oscillating force along a single axis depending on the frequency and the amplitude of the electrical driving signal. Voice coil actuators per se are well known in the art (Bill Black, et al: "Basics of Voice Coil Actuators" in PCIM Power Electronics Systems, July 1993).

Typically, linear resonant actuators have shorter start-up times, consume less electrical energy and produce less noise than eccentric rotating mass motors and are thus becoming increasingly popular.

Like touch screens, capacitive buttons often substitute conventional push buttons comprising a mechanical assembly of a displaceable button supported by a resilient element such as a spring or an elastomer element. Accordingly, simulating the feel of a conventional push button is often desired as a haptic effect. However, a somewhat realistic impression of a conventional button is not easy to achieve employing vibrotactile means only and usually requires multiple vibrating actuators or actuators that are large in size. In consequence, the space required inside a respective device and costs for implementing such solutions are considerable. Further, despite the efforts taken, the vibrotactile effects achieved using driving patterns known from the prior art are often not perceived by users to resemble conventional push buttons to a satisfactory degree.

US 2012/0200509 A1 discloses an actuator coupled to a controller so as to receive a driving pattern ("haptic profile") and to generate a sine wave from the driving pattern that corresponds to a desired haptics effect. According to the driving pattern, amplitude, frequency and duration of a drive period vary.

Further Background prior art to the present disclosure is described in US 2016/0246376 A1, US 2016/0155305 A1, U.S. Pat. No. 9,235,267, US 2007/0152974 A1, U.S. Pat. No. 8,860,562 and US 2010/0097198 A1.

SUMMARY

It is therefore an object of the present disclosure to provide a method and a device for generating a haptic effect reducing at least some of the problems associated with prior art applications. It is a further object of the present disclosure to provide a haptic impression differing from vibrotactile effects previously known.

In view of the above objects, according to one aspect, the present disclosure provides a method of generating a haptic effect on a touch screen or a capacitive button, wherein an AC driving signal is generated to cause a linear resonant actuator to vibrate during a drive period to generate the haptic effect, and the AC driving signal is controlled to vary its frequency over course of the drive period. The drive period comprises a first time segment during which the frequency of the AC driving signal is held substantially constant to a first frequency value lower than a resonant frequency of the linear resonant actuator, a second time segment during which the frequency of the AC driving signal is held substantially constant to a second frequency value approximately equal to, preferably deviating less than 2% from, the resonant frequency, and a third time segment during which the frequency of the AC driving signal is controlled to decrease from a third frequency value lower than the first frequency value to a fourth frequency value lower than the third frequency value. Substantially constant means preferably increasing or decreasing less than 5%, particularly preferably increasing or decreasing less than 2% over the course of time.

The resulting effect allows to simulate the feel of a real mechanical button better than vibrotactile systems commonly known from the prior art. In particular, gradually decreasing frequency in the third time segment gives the perception of softness.

Preferably, the first time segment precedes the second time segment and the second time segment precedes the third time segment.

Preferably, the first time segment precedes the first time segment and the second time segment precedes said third time segment.

In a particularly preferred embodiment, the first frequency value amounts to at least 85% and at most 98% of the second frequency value.

It is further preferred to control the AC driving signal to vary its amplitude over course of the drive period. Therein it is particularly advantageous to control the amplitude of the AC driving signal to decrease during the third time segment. Gradually decreasing amplitude in the third time segment adds to the perception of softness.

According to an advantageous embodiment, the amplitude of the AC driving signal in the first time segment is controlled to increase from an initial amplitude value of the first time segment to a local amplitude maximum and to decrease to a terminal amplitude value of the first time segment, which is preferably higher than the initial amplitude value of the first time segment and preferably higher than a terminal amplitude value of the third time segment. Also preferably, the local amplitude maximum is lower than a maximum of the amplitude of the AC driving signal in the second time segment. Further, the terminal value of the third time segment is preferably equal to or higher than the initial amplitude value of the first time segment.

Preferably, the second time segment is longer than the first time segment. Also preferably, the third time segment is longer than said first time segment, preferably longer than said second time segment.

Advantageously, the lower limit of the length of first time segment is 0 ms and the upper limit of the length of the first time segment is between 10 ms and 15 ms, most preferably 12 ms, the lower limit of the length of the second time segment is between 10 ms and 15 ms, most preferably 12 ms and the upper limit of the length of the second time segment is between 20 ms and 30 ms, most preferably 25 ms, and the lower limit of the length of the third time segment is between 20 ms and 30 ms, most preferably 25 ms and the upper limit of the length of the second time segment is between 60 ms and 80 ms, most preferably between 70 ms and 75 ms.

According to a particularly advantageous embodiment, the amplitude of the AC driving signal is scaled depending on the distance between a touch detected on the touch screen and the linear resonant actuator.

The present disclosure can be advantageously implemented on a device comprising the (capacitive or resistive) touch screen and/or a capacitive button, a linear resonant actuator and an AC driving signal controller for controlling the AC driving signal. The controller can be advantageously implemented in many ways, e.g. using a customized IC, a DSP or a CPU executing a software implementation of the controller. Preferably, the device comprises a closed loop (back EMF feedback control) of the linear resonant actuator (LRA).

The linear resonant actuator (LRA) can be a standard LRA, preferably a coin type (cylindrical) LRA and most preferably a brushless LRA. Accordingly, the present disclosure can be implemented at low cost, using for the most part standard hardware components.

To implement the disclosure, there is no need of a symmetrical AC voltage source, but an asymmetrical AC voltage source (negative or positive AC amplitude) is sufficient to generate a suitable AC driving signal. For example, driving voltages are kept maximum around 2.80 V to 3.20 V (maximum amplitude of the driving signal) to remain under 3.80 V battery voltage or up to 3.90 V (maximum amplitude of the driving signal) to remain under 4.20 V battery voltage. Also advantageously possible but not particularly preferred is use of a DC-DC boost (step-up) converter so that driving voltages can be increased theoretically unlimited, for example up to 15 V-25 V in practical application.

The disclosure is applicable to a wide variety of devices, e.g. mobile phones, in particular smartphones, tablets or other consumer electronics.

While the present disclosure is particularly useful in single LRA devices, it can also be implemented in devices having more than one LRA.

Generally, any of the embodiments described or options mentioned herein may be particularly advantageous depending on the actual conditions of application. Further, features of one embodiment may be combined with features of another embodiment as well as features known per se from the prior art as far as technically possible and unless indicated otherwise.

In the following, embodiments according to the disclosure will be described in more detail by way of example. The accompanying drawings, which are schematic illustrations only, serve for a better understanding of the features of the present disclosure.

DETAILED DESCRIPTION

Figure 1:
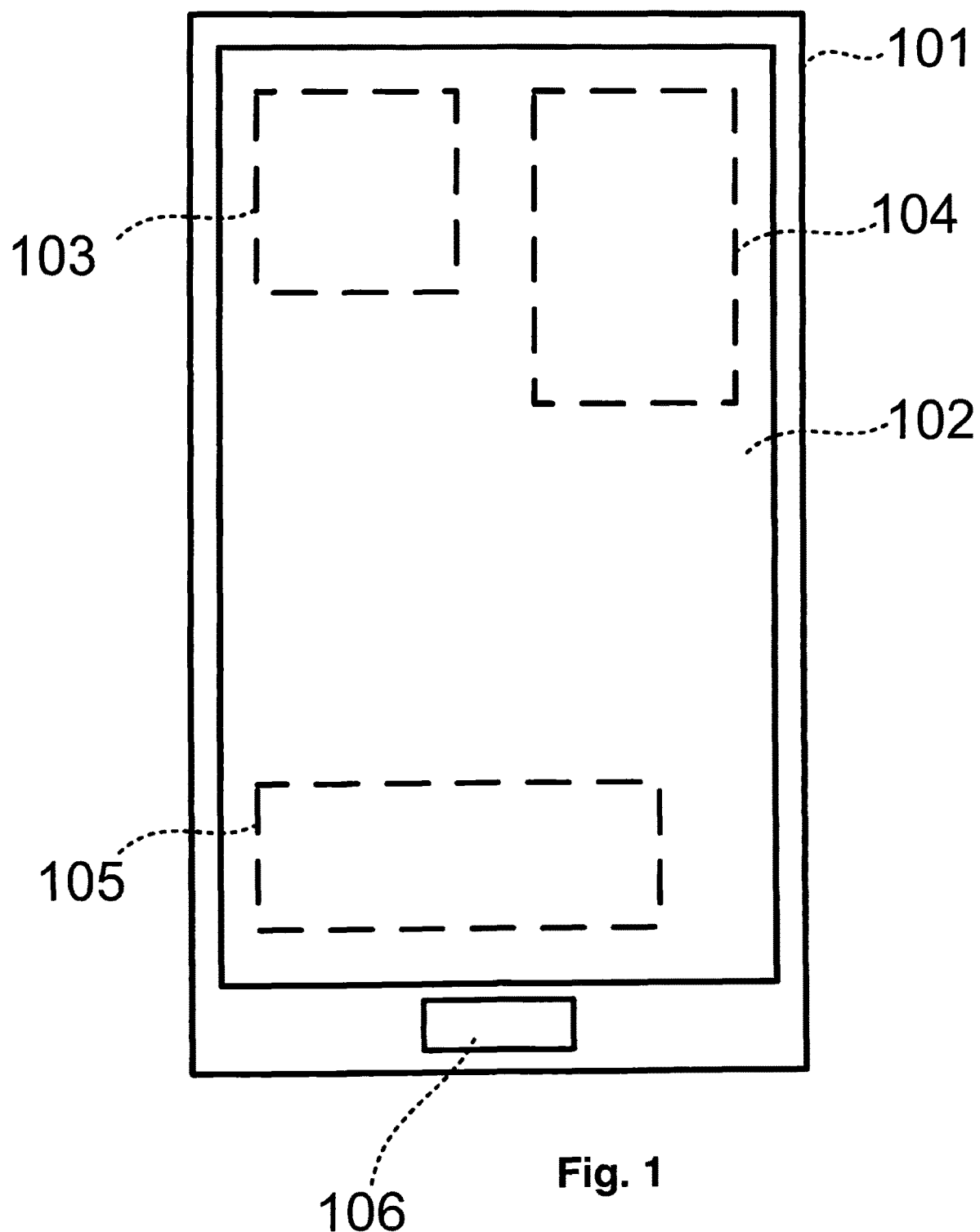
FIG. 1 is a schematic diagram of a top view onto a touch screen of a smartphone device according to the present disclosure.

FIG. 1 is a schematic top view of a touch screen device 101 according to the present disclosure. In particular, the depicted touch screen device 101 is a smartphone similar to conventional smartphones and comprises a conventional capacitive or resistive touch screen 102 and a non-displaceable physical capacitive button 106 such as a home button. As generally known from the prior art, the touch screen 102 can be, for example, of EPD (electronic paper display) or backlit TFT (thin film transistor) or OLED (organic light emitting diodes) type to display alphanumeric and graphic screen contents and is further used to detect user touch operations for operating a standard GUI (graphical user interface). Three different exemplary touch regions 103, 104 and 105 are indicated by dashed lines, the touch regions 103, 104 and 105 depicting push button images in applications executed under the GUI.

Not shown in FIG. 1 is a coin type LRA (linear resonant actuator) situated underneath and in a close proximity of the lower screen part touch region 105 and the driving circuitry and closed loop control thereof. The longitudinal axis of the cylindrical LRA is perpendicular relative to the touch screen 102 surface. To reduce cost of manufacture, overall size, weight and power consumption, the touch screen device 101 is implemented as a single LRA device.

Figure 2:
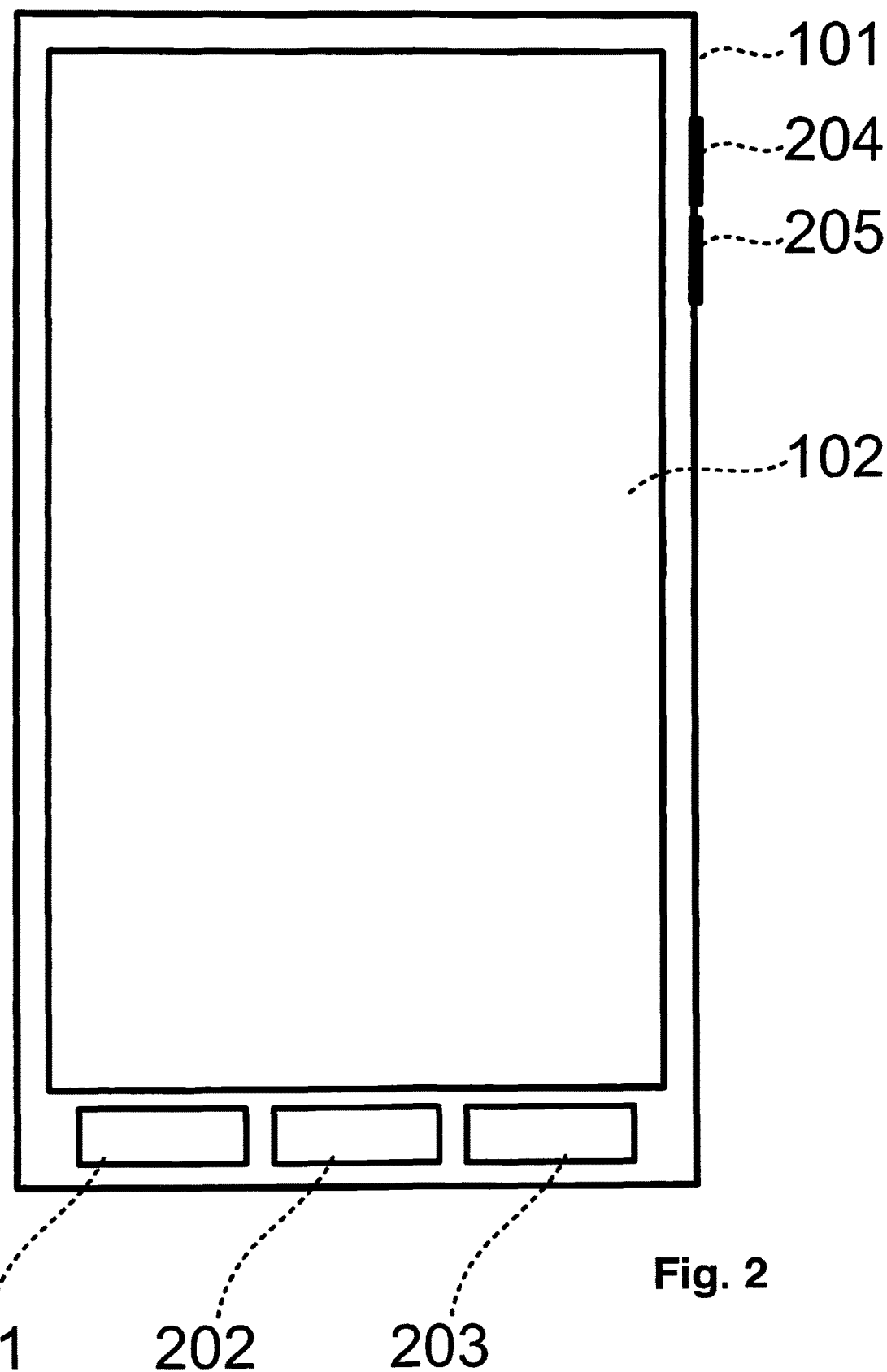
FIG. 2 is a schematic diagram of another smartphone device according to the present disclosure in top view similar to FIG. 1.

FIG. 2 shows a touch screen device 101 similar to FIG. 1 with a first 201, second 202, third 203, fourth 204 and fifth physical capacitive button 205, used for example as a back button 201, home button 202, function button 203, sound volume up button 204 and sound volume down button 205. Like the touch screen device 101 in FIG. 1 the touch screen device 101 of FIG. 2 is a smartphone that can be operated using a GUI.

Figure 3:
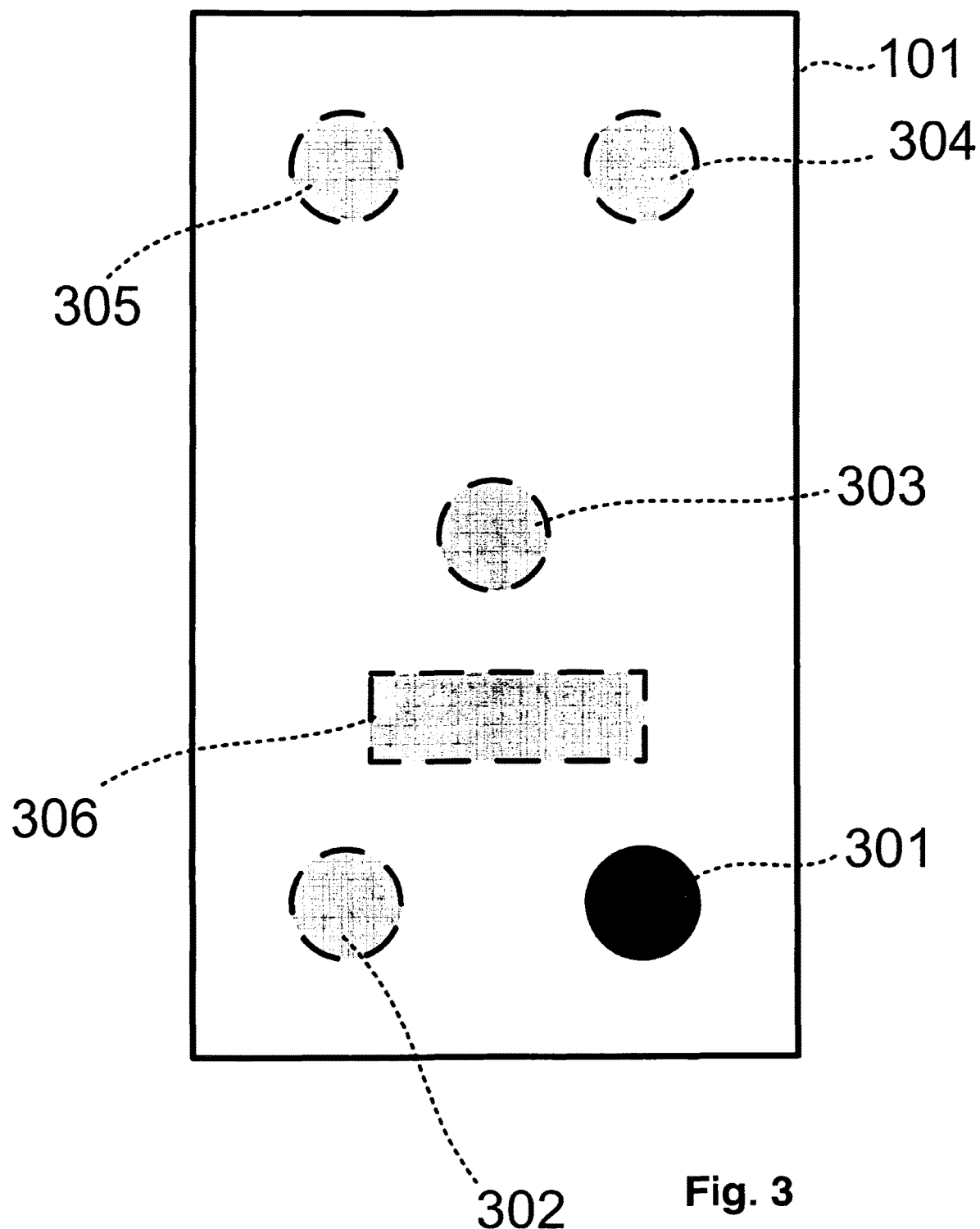
FIG. 3 is a schematic diagram of a sectional drawing of a smartphone device according to the present disclosure like the smartphone device depicted in FIG. 2.

FIG. 3 is a cutaway drawing of the touch screen device 101 in FIG. 2 showing placement of LRAs only, not showing other circuitry, which can be implemented essentially as known from the prior art. Therein, a first coin type (cylindrical) linear resonant actuator 301 is placed at the lower right hand side of the touch screen device 101 in proximity of the right (third) physical capacitive button 203, a second coin type linear resonant actuator 302 is placed at the lower left hand side of the touch screen device 101 in proximity of the left (first) physical capacitive button 201, a third coin type linear resonant actuator 303 is placed in the center of the touch screen device 101, a fourth coin type linear resonant actuator 304 is placed at the upper right hand side of the touch screen device 101, a fifth coin type linear resonant actuator 305 is placed at the upper left hand side of the touch screen device 101. Reference numeral 306 symbolizes an arbitrary other type of linear resonant actuator as known per se from the prior art or a, for example rectangular, combination of LRAs placed near a lower center part of the touch screen 102.

Figure 4:
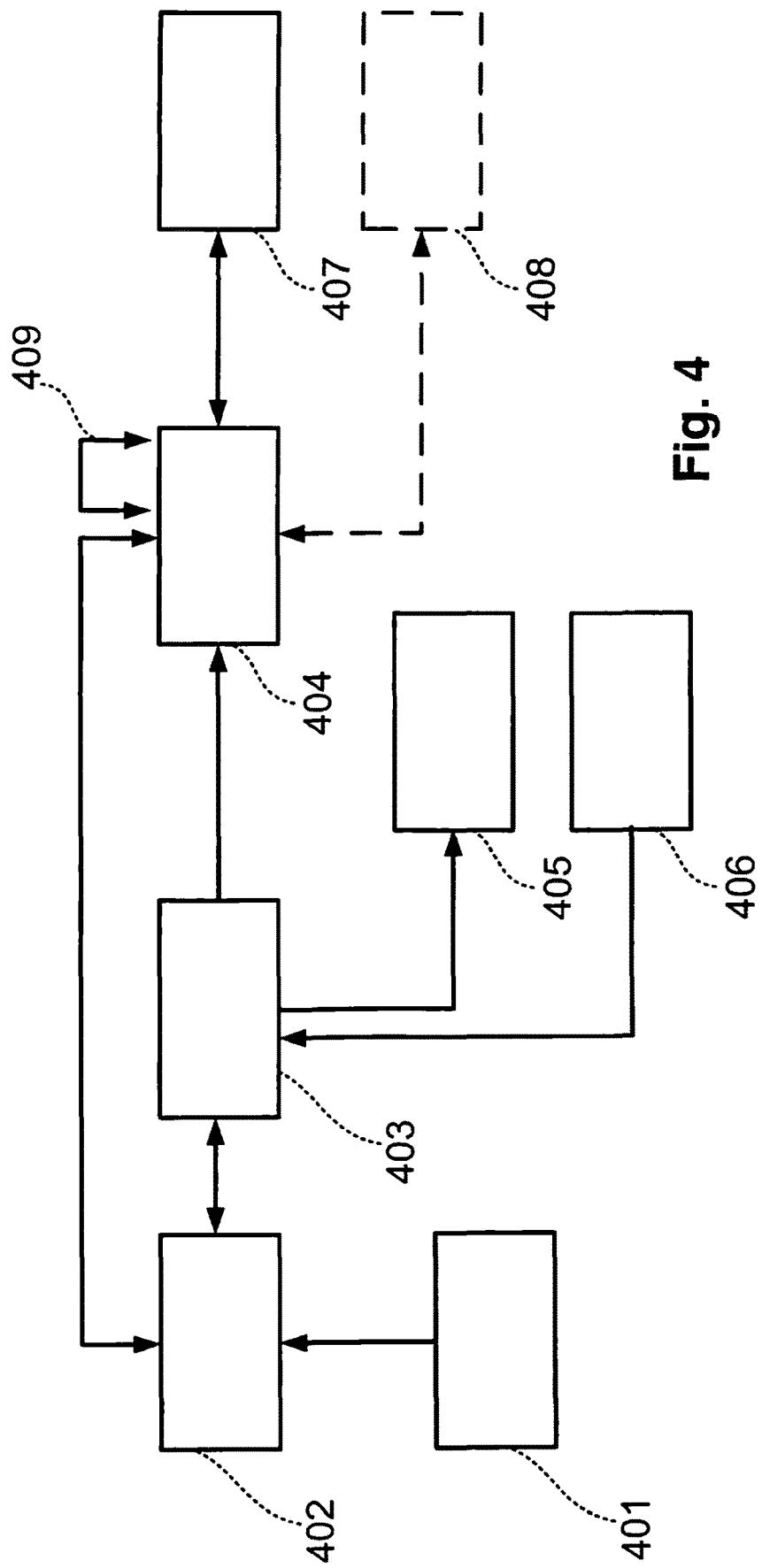
FIG. 4 is a block diagram of an exemplary actuator driving circuitry in one embodiment of the present disclosure.

FIG. 4 shows a schematic block diagram of an exemplary actuator driving circuitry suitable for driving the LRA of the touch screen device 101 of FIG. 1. The battery 401 is connected to battery management circuitry 402 which in turn is controlled by the main system IC set 403 comprising a CPU, a microcontroller, a memory chip set and an input/output chip set. The main system IC set further controls the actuator drive stage 404 connected to the battery management circuitry 402 and controlled by the main system IC set 403 to provide the AC driving signal to the LRA 407 according to predetermined waveforms such as the waveform depicted in FIG. 5. As per se known from closed loop LRA control setups of the prior art, the actuator drive stage 404 is also configured to detect a back EMF feedback 409 for a closed loop control. The general setup of FIG. 4 can also be used for controlling additional linear resonant actuators 408, such as first through sixth LRAs 301-306 in FIG. 2.

As in conventional smartphones, the main system IC set 403 further controls the actual display (e.g. TFT or OLED) 405 with (e.g. capacitive) touch detection 406.

Figure 5:
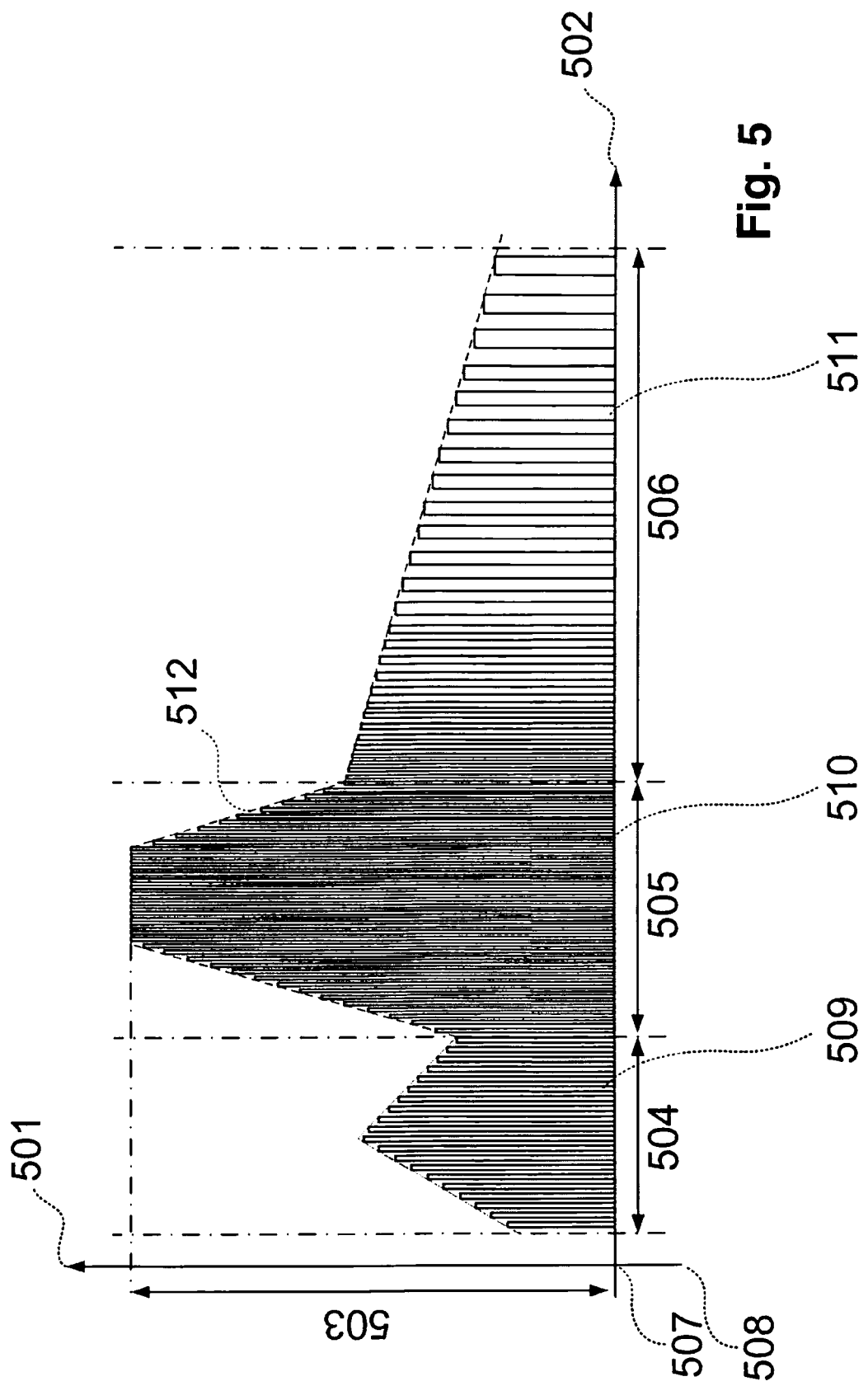
FIG. 5 is a diagram of an exemplary AC driving signal waveform of one drive period with the abscissa indicating time and the ordinate indicating voltage.
Figure 6:
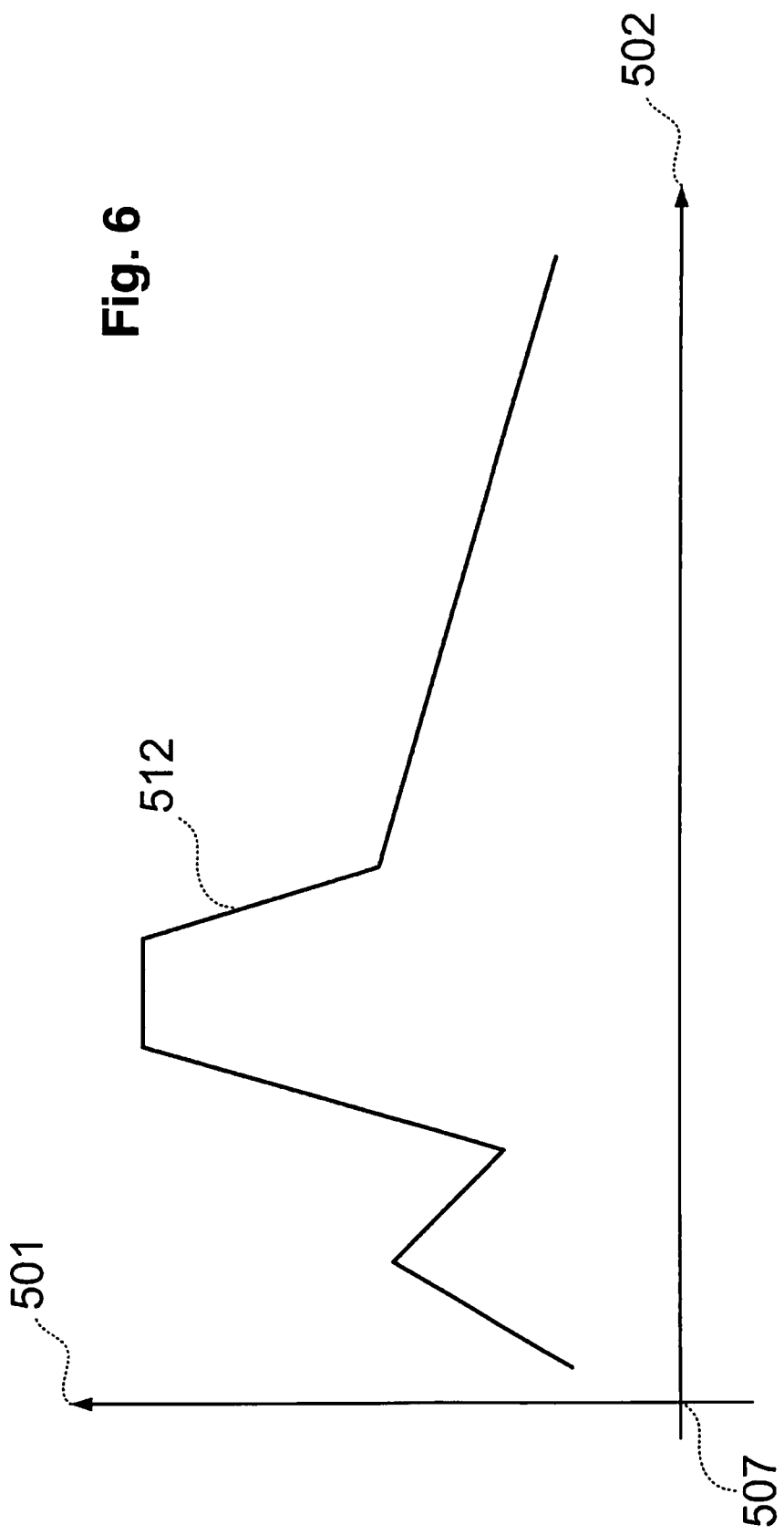
FIG. 6 shows the envelope curve of the AC driving signal waveform depicted in FIG. 5.
Figure 7:
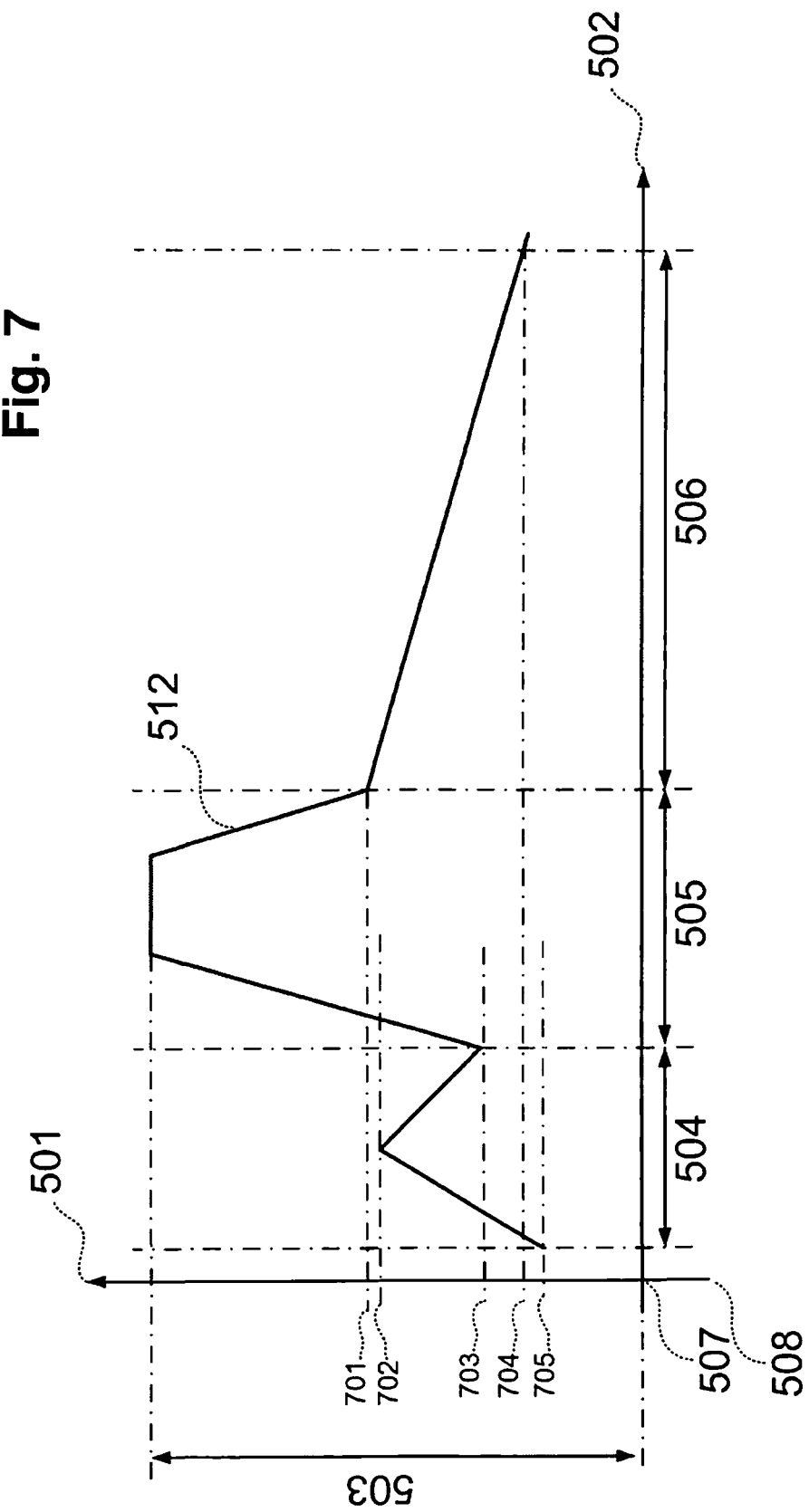
FIG. 7 illustrates critical amplitude levels in the envelope curve of FIG. 6.

A typical AC driving signal waveform supplied by the actuator drive stage 404 is schematically depicted in FIG. 5. Therein, voltage (ordinate 501) is plotted over time (abscissa 502) with a zero amplitude level indicated by reference numeral 507. The varying amplitude can be best seen in the respective envelope curve 512 depicted in FIGS. 6 and 7, with FIG. 7 indicating the critical amplitude levels 701-705.

Figure 8:
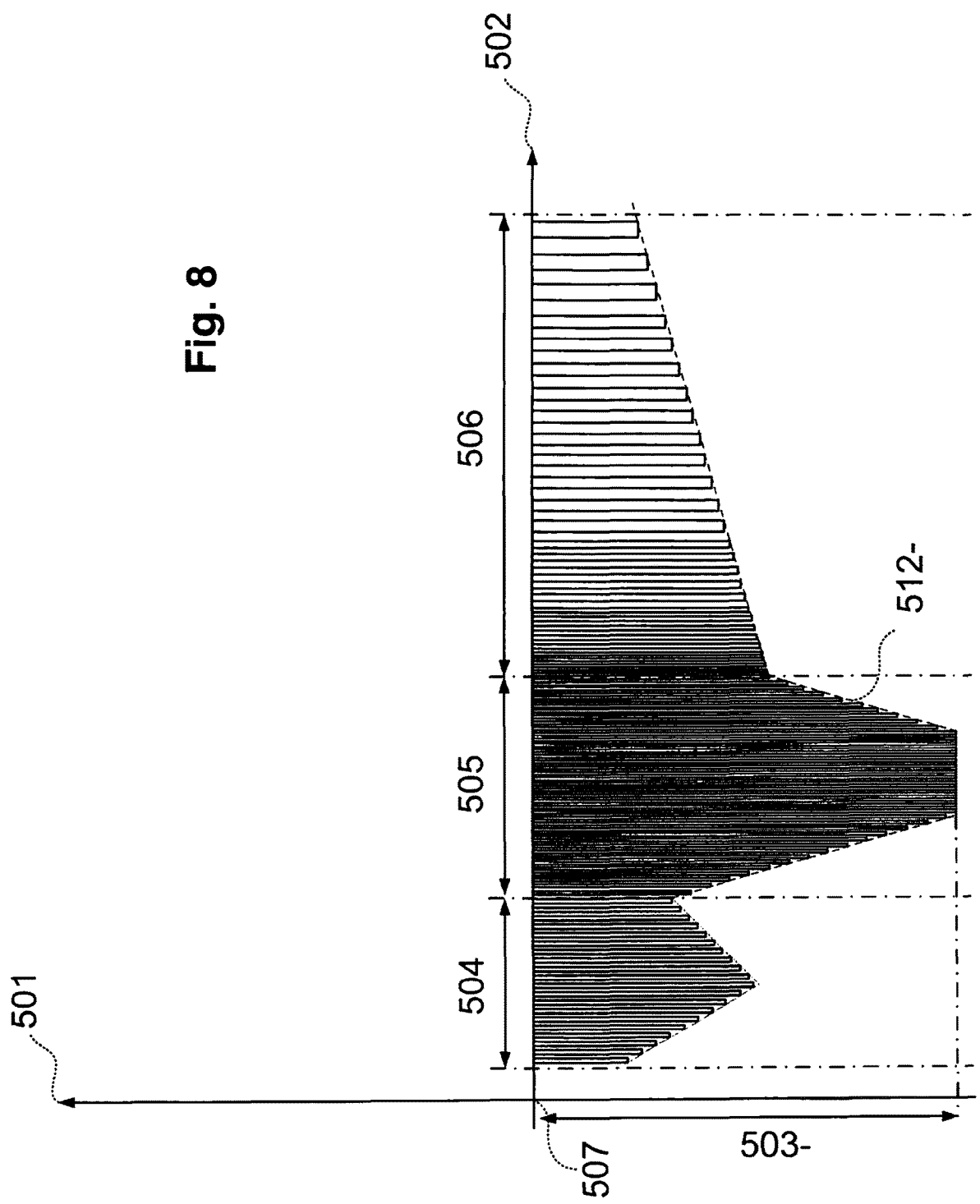
FIG. 8 shows an exemplary AC driving signal waveform like FIG. 5 but with a negative driving voltage.

Generally, the novel LRA driving pattern embodied by the AC driving signal waveform depicted in FIG. 5 may have an all positive (or all negative, as depicted in FIG. 8) actuation starting oscillations with a first frequency 509 just (e.g. 2-15 percent) under the resonance frequency 510 of the LRA 407, for example approximately 300 Hz, in a first time segment 504 of the drive period. The frequency is then increased to the resonance frequency 510 in a second time segment 505 longer than the first time segment 504. Then the driving frequency along with the amplitude is gradually reduced in a third time segment 506 longer than the second time segment.

As can be seen from the envelope 512, the amplitude of the AC driving signal varies not only in the third time segment 506 of the drive period but preferably also in the first and second time segments 504, 505. Therein, the amplitude increases from an initial amplitude value 705 of the first time segment 504 to a local amplitude maximum 702 and decreases to a terminal amplitude value 703 of the first time segment 504, which is higher than the initial amplitude value 705 of the first time segment 504.

In the second time segment 505 immediately following the first time segment 504, the amplitude is quickly increased to the overall peak amplitude 503 and held constant for a predetermined time before quickly dropping to the initial amplitude value 701 of the third time segment 506 immediately following the second time segment 505. The terminal amplitude value 704 of the third time segment 506 is preferably higher than the initial amplitude value 705 of the first time segment 504.

For example, the length of the first time segment may range from 0 Milliseconds to 10 through 15 Milliseconds, most preferably 12 Milliseconds, the length of the second time segment may range from 10 through 15 Milliseconds, most preferably 12 Milliseconds, to 20 through 30 Milliseconds, most preferably 25 Milliseconds, and the length of the third time segment may range from 20 through 30 Milliseconds, most preferably 25 Milliseconds, to 60 through 80 Milliseconds, most preferably 70 through 75 Milliseconds.

As noted above and shown in FIG. 8, the excitation may also be achieved with a negative voltage AC drive signal with an envelope 512 and a negative peak amplitude 503.

Figure 9:
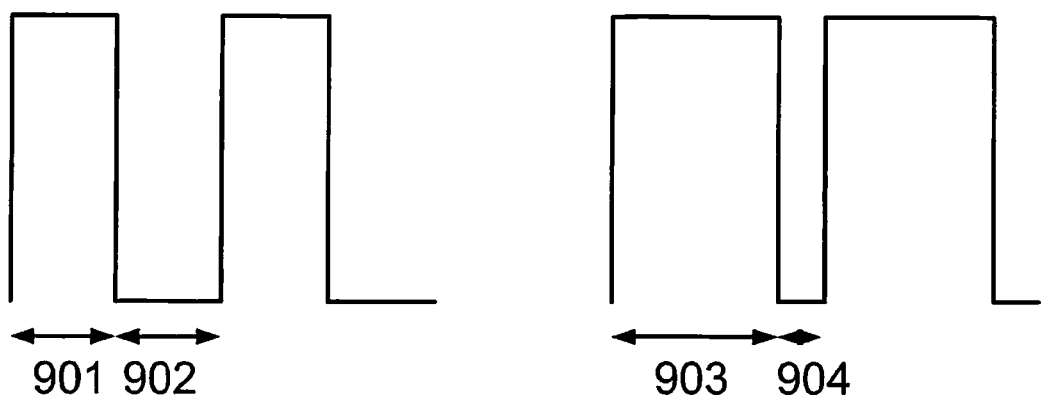
FIG. 9 illustrates two different duty cycles.

As indicated in FIG. 9, duty cycles may vary with an on cycle 901 and off cycle 902 of approximately equal length (left side in FIG. 9) or a longer on cycle 903 and shorter off cycle 904 (right side in FIG. 9), respectively.

Figure 10:
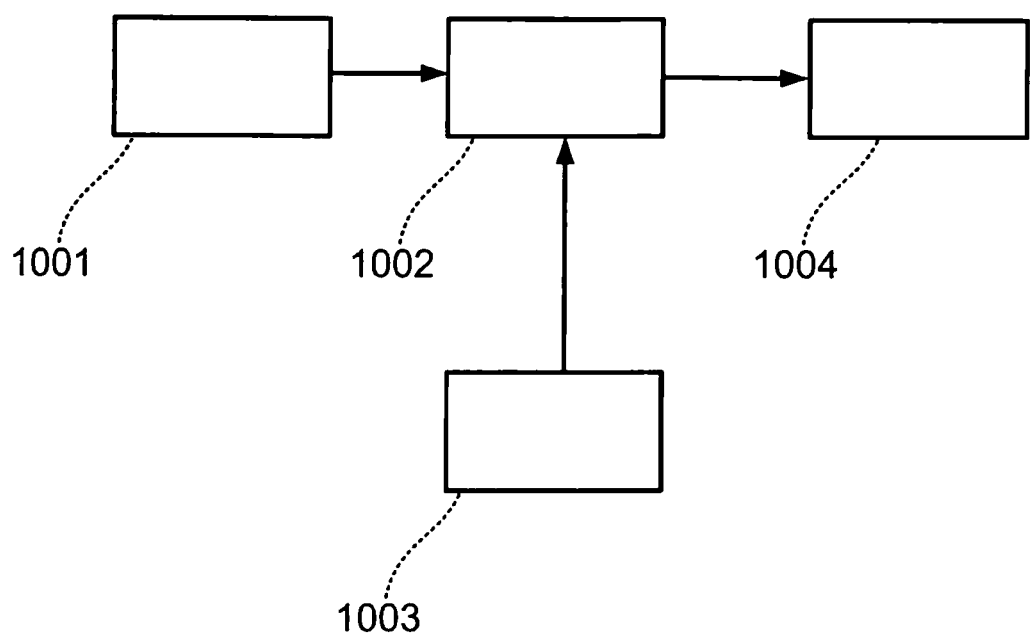
FIG. 10 is a block diagram of an exemplary scaling control for scaling the amplitude of the main driving signal.

For single LRA in particular, pressing different locations on the screen may require some adjustments on the AC driving signal in order to achieve the essentially same haptic impression despite different distances between the location of the LRA and respective touch regions 103-105. Therein, the driving signal is scaled according to a scaling control like the one in FIG. 10. The main driving signal 1001 is subjected to amplitude scaling 1002 according to a touch input detection signal depending on the touch region 103-105 where a touch is detected. The scaling essentially comprises an amplitude multiplication by a scaling factor. The scaled output signal 1004 is used to drive the LRA.

Figure 11:
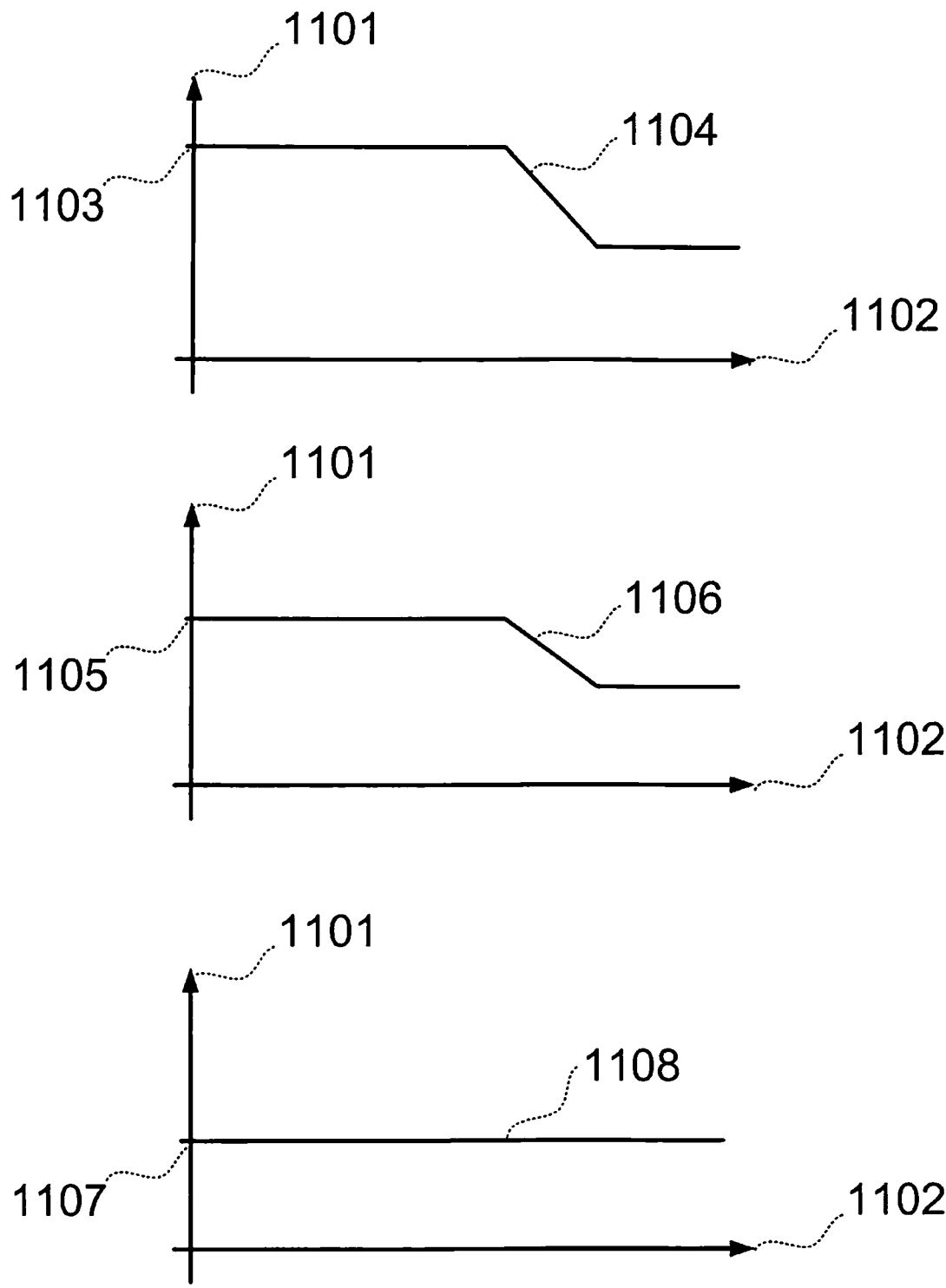
FIG. 11 illustrates application of three different scaling factors in peak amplitude over time diagrams.

FIG. 11 illustrates application of three different scaling factors in peak amplitude 1101 over time 1102 diagrams. The graph 1103 indicates an amplitude scaling by a factor of, for example, 0.8 to 1 adapted to suit a more remote touch region like the upper left hand touch region 103. The graph 1105 indicates an amplitude scaling by a factor of, for example, 0.6 to 0.8 adapted to suit the upper right hand touch region 104. The graph 1107 indicates an amplitude scaling by a factor of, for example, 0.4 to 0.6 adapted to suit a touch region near the LRA position like the lower screen part touch region 105 or the physical capacitive button 106. Reference numerals 1104, 1106 and 1108 indicate respective filtering.

Figure 12:
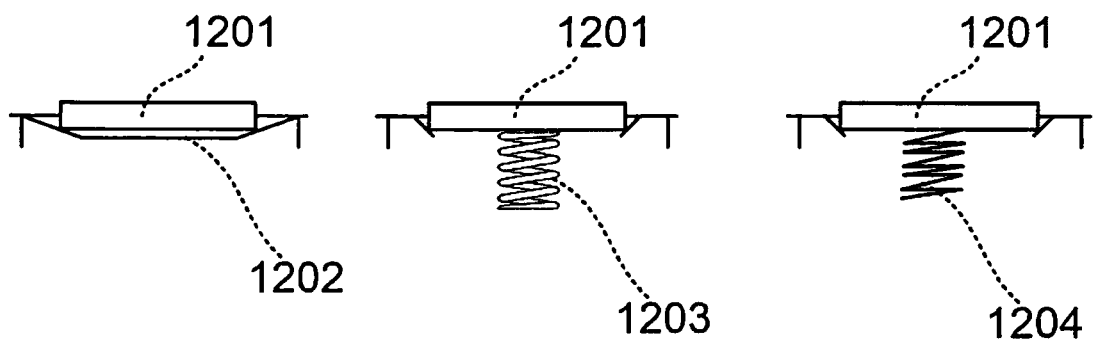
FIG. 12 shows schematic examples of mechanical push buttons simulated by haptic effects generated according to the present disclosure.

The present disclosure allows to create a haptic effect similar to the one perceived with displaceable mechanical buttons 1201, supported by resilient elastomer elements 1202 or spring assemblies 1203, 1204 like the ones depicted in FIG. 12.

The disclosure provides a method of generating a haptic effect on a touch screen or a capacitive button, said method comprises generating an AC driving signal to cause a linear resonant actuator to vibrate during a drive period to generate said haptic effect, and controlling said AC driving signal to vary its frequency over course of said drive period, wherein said drive period comprises a first time segment during which the frequency of said AC driving signal is held substantially constant to a first frequency value lower than a resonant frequency of said linear resonant actuator, a second time segment during which the frequency of said AC driving signal is held substantially constant to a second frequency value approximately equal to said resonant frequency, and a third time segment during which the frequency of the AC driving signal is controlled to decrease from a third frequency value lower than said first frequency value to a fourth frequency value lower than said third frequency value.

| Reference Numerals: | |
|---|---|
| 101 | Touch screen device |
| 102 | Touch screen |
| 103 | Upper left hand touch region |
| 104 | Upper right hand touch region |
| 105 | Lower screen part touch region |
| 106 | Physical capacitive button |
| 201 | First physical capacitive button |
| 202 | Second physical capacitive button |
| 203 | Third physical capacitive button |
| 204 | Fourth physical capacitive button |
| 205 | Fifth physical capacitive button |
| 301 | First linear resonant actuator |
| 302 | Second linear resonant actuator |
| 303 | Third linear resonant actuator |
| 304 | Fourth linear resonant actuator |
| 305 | Fifth linear resonant actuator |
| 306 | Sixth linear resonant actuator |
| 401 | Battery |
| 402 | Battery management |
| 403 | Main system IC set |
| 404 | Actuator drive stage |
| 405 | Display |
| 406 | Touch detection |
| 407 | Linear resonant actuator |
| 408 | Additional linear resonant actuator |
| 409 | EMF feedback |
| 501 | Voltage axis |
| 502 | Time axis |
| 503 | Peak amplitude |
| 504 | First time segment |
| 505 | Second time segment |
| 506 | Third time segment |
| 507 | Zero amplitude level |
| 509 | First driving signal frequency |
| 510 | Resonance frequency |
| 511 | Decreasing frequency |
| 512 | Driving signal envelope |
| 701 | Initial amplitude value of third time segment |
| 702 | Local amplitude maximum of first time segment |
| 703 | Terminal amplitude value of first time segment |
| 704 | Terminal amplitude value of third time segment |
| 705 | Initial amplitude value of first time segment |
| 901 | 50% on cycle |
| 902 | 50% off cycle |
| 903 | Longer on cycle |
| 904 | Shorter off cycle |
| 1001 | Main driving signal |
| 1002 | Amplitude scaling |
| 1003 | Touch input detection signal |
| 1004 | Output signal |
| 1101 | Peak amplitude axis |
| 1102 | Time axis |
| 1103 | First scaling |
| 1104 | First filtering |
| 1105 | Second scaling |
| 1106 | Second filtering |
| 1107 | Third scaling |
| 1108 | Third filtering |
| 1201 | push button |
| 1202 | Resilient elastomer element |
| 1203 | Spring |
| 1204 | Spring |

The invention claimed is:

1. A method of generating a haptic effect on a touch screen or a capacitive button, the method comprising:

generating an AC driving signal to cause a linear resonant actuator to vibrate during a drive period to generate the haptic effect; and controlling the AC driving signal to vary its frequency over course of the drive period;

wherein the drive period comprises a first time segment during which the frequency of the AC driving signal is held substantially constant to a first frequency value lower than a resonant frequency of the linear resonant actuator, a second time segment during which the frequency of the AC driving signal is held substantially constant to a second frequency value approximately equal to the resonant frequency, and a third time segment during which the frequency of the AC driving signal is controlled to decrease from a third frequency value lower than the first frequency value to a fourth frequency value lower than the third frequency value.

2. The method according to claim 1, wherein the first time segment precedes the first time segment and the second time segment precedes the third time segment.

3. The method according to claim 1, wherein the first frequency value amounts to at least 85% and at most 98% of the second frequency value.

4. The method according to claim 1, wherein the AC driving signal is further controlled to vary its amplitude over course of the drive period.

5. The method according to claim 4, wherein the amplitude of the AC driving signal is controlled in the first time segment to increase from an initial amplitude value of the first time segment to a local amplitude maximum and to decrease to a terminal amplitude value of the first time segment.

6. The method according to claim 5, wherein the terminal amplitude value of the first time segment is higher than the initial amplitude value of the first time segment.

7. The method according to claim 5, wherein the terminal amplitude value of the first time segment is higher than a terminal amplitude value of the third time segment.

8. The method according to claim 5, wherein the local amplitude maximum is lower than a maximum of the amplitude of the AC driving signal in the second time segment.

9. The method according to claim 4, wherein the amplitude of the AC driving signal is controlled to decrease during the third time segment.

10. The method according to claim 4, wherein a terminal amplitude value of the third time segment is equal or higher than an initial amplitude value of the first time segment.

11. The method according to claim 1, wherein the second time segment is longer than the first time segment.

12. The method according to claim 1, wherein the third time segment is longer than the first time segment.

13. The method according to claim 1, wherein the amplitude of the AC driving signal is scaled depending on a distance between a touch detected on the touch screen and the linear resonant actuator.

14. A device configured to perform the method according to claim 1, the device comprising the touch screen and/or the capacitive button, the linear resonant actuator and an AC driving signal controller for controlling the AC driving signal.

15. The device of claim 14 further comprising a back EMF feedback control.

* * * * *